United States Patent [19]

Yoke

[11] 4,129,119
[45] Dec. 12, 1978

[54] SOLAR ENERGY COLLECTOR

[76] Inventor: James H. Yoke, Rte. 15, Box 395, Acton, Ind. 46259

[21] Appl. No.: 796,179

[22] Filed: May 12, 1977

[51] Int. Cl.$^2$ .............................................. F24J 3/02
[52] U.S. Cl. ................................... 126/271; 126/270; 285/20; 350/288; 350/299
[58] Field of Search ............... 126/270, 271; 237/1 A; 350/292, 293, 299; 60/641; 285/19, 20, 192

[56] References Cited

U.S. PATENT DOCUMENTS

| 1,162,505 | 11/1915 | Nichols | 126/271 |
| 2,141,330 | 12/1938 | Abbot | 126/271 |
| 2,205,378 | 6/1940 | Abbot | 126/271 |
| 2,247,830 | 7/1941 | Abbot | 126/271 |
| 4,038,971 | 8/1977 | Bezborodko | 126/271 |

FOREIGN PATENT DOCUMENTS 559981 3/1944 United Kingdom ...................... 285/20

Primary Examiner—Kenneth W. Sprague
Assistant Examiner—James C. Yeung
Attorney, Agent, or Firm—Woodard, Weikart, Emhardt & Naughton

[57] ABSTRACT

A solar energy collector is disclosed herein which comprises a pipe interconnecting lower and upper headers, the upper header structurally supporting the pipe. The pipe extends within an opening in the lower header and includes an exterior shoulder which rests upon the lower header. The other end of the pipe includes an exterior shoulder, the pipe extending into an opening in the upper header. A spring rests on the shoulder on the upper end of the pipe and holds a combination bearing and fluid seal against the upper header. A parabolic reflector is supported by the pipe, and a fluid is movable through the pipe from one header to the other for receiving the solar energy focused upon the pipe by the reflector. The pipe is operable to rotate to direct the reflector toward the sun.

9 Claims, 6 Drawing Figures

SOLAR ENERGY COLLECTOR

BACKGROUND OF THE INVENTION

1. Field of the Invention

The present invention relates to an apparatus for receiving and collecting solar energy, and more particularly to an apparatus of this type which is operable to track the movement of the sun.

2. Description of the Prior Art

The importance and potential of solar energy are becoming more apparent as the need for sources of energy increases. A system for the production of solar energy requires many components for receiving concentrating, transfering and storing the energy. The present invention is directed at an inexpensive and readily constructed apparatus for collecting solar energy in a fluid medium.

In U.S. Pat. No. 3,985,119, issued to Oakes on Oct. 12, 1976, there is disclosed a solar energy collector including a parabolic trough having a reflective surface for directing the radiation at a fluid conduit systems located along the focal line of the trough. The trough is rotatably mounted along the focal line to a yoke, which is itself rotatably mounted to a vertical stand. Rotation of the yoke relative the stand produces horizontal movement of the trough, whereas rotation of the trough relative the mounting yoke varies the vertical aim of the trough. Radiation received by the parabolic reflecting trough is directed to the focal line of the trough and to the fluid conduit systems there located. The conduit systems comprise tubular members suspended about at the focal line of the trough by extensions of the tubular members which pass to and through the back of the trough. The Oakes device includes several tubular members in the conduit systems, but none of these tubular members is used to structurally support the reflector or associated framework.

A solar energy steam generator is disclosed in U.S. Pat. No. 3,915,147, issued to Rineer on Oct. 28, 1975. The Rineer generator includes heat-absorption units mounted along the focal line of curved reflectors, the relationship with the reflectors being altered in response to conditions in the heat-absorption units. Elevation of the temperature within the units causes the apparatus to defocus the reflectors, or check valves are included to respond to the temperature within the units. The Rineer apparatus has a relatively complex and expensive flow system, and the heat-absorption units do not structurally support the associated apparatus. The units are not capable of being tracked to follow the movement of the sun. Similarly, a solar heat transducer apparatus is disclosed in U.S. Pat. No. 3,514,942, issued to Kyryluk on June 2, 1970. The Kyryluk device comprises a solar heater in which a heated fluid rises within the unit and drives a turbine to provide a power source. The Kyryluk apparatus is an independent unit which is not adapted to use with an associated solar energy system which collects the energy in a fluid medium.

In U.S. Pat. No. 3,125,091, issued to Sleeper on Mar. 17, 1964, there is disclosed an inflatable solar energy collector. The Sleeper apparatus includes an integral, zoned portion designed to focus solar energy on a predetermined, restricted area within the inflated collector. Solar energy systems useful for heating and or cooling a structure are disclosed in U.S. Pat. Nos. 3,262,493, issued to Hervey on July 26, 1966, and 3,254,703, issued to Thomason on June 7, 1966.

SUMMARY OF THE INVENTION

One embodiment of the present invention is a solar energy collector adapted for use with a solar energy system comprising, a lower header defining an open interior, a pipe connected to the lower header, the pipe defining a passageway communicating with the interior of the lower header, an upper header connected with the pipe, the upper header defining an open interior communicating with the passageway of the pipe, means for supporting the upper header above the lower header, and a reflector mounted to and supported by the pipe, the reflector being oriented to direct rays impinging thereupon at the pipe.

It is an object of the present invention to provide a solar energy collector adapted for use with a solar energy system which is simple and inexpensive to construct.

Another object of the present invention is to provide a solar energy collector including a pipe for transmitting the energy-absorbing fluid and supported by upper and lower headers through which the fluid flows.

It is a further object of the present invention to provide a solar energy collector including a pipe which supports a parabolic reflector and is operable to rotate to correspondingly rotate the supported reflector.

Further objects and advantages of the present invention will become apparent from the description of the preferred embodiment which follows.

DESCRIPTION OF THE PREFERRED EMBODIMENT

Figure 1:
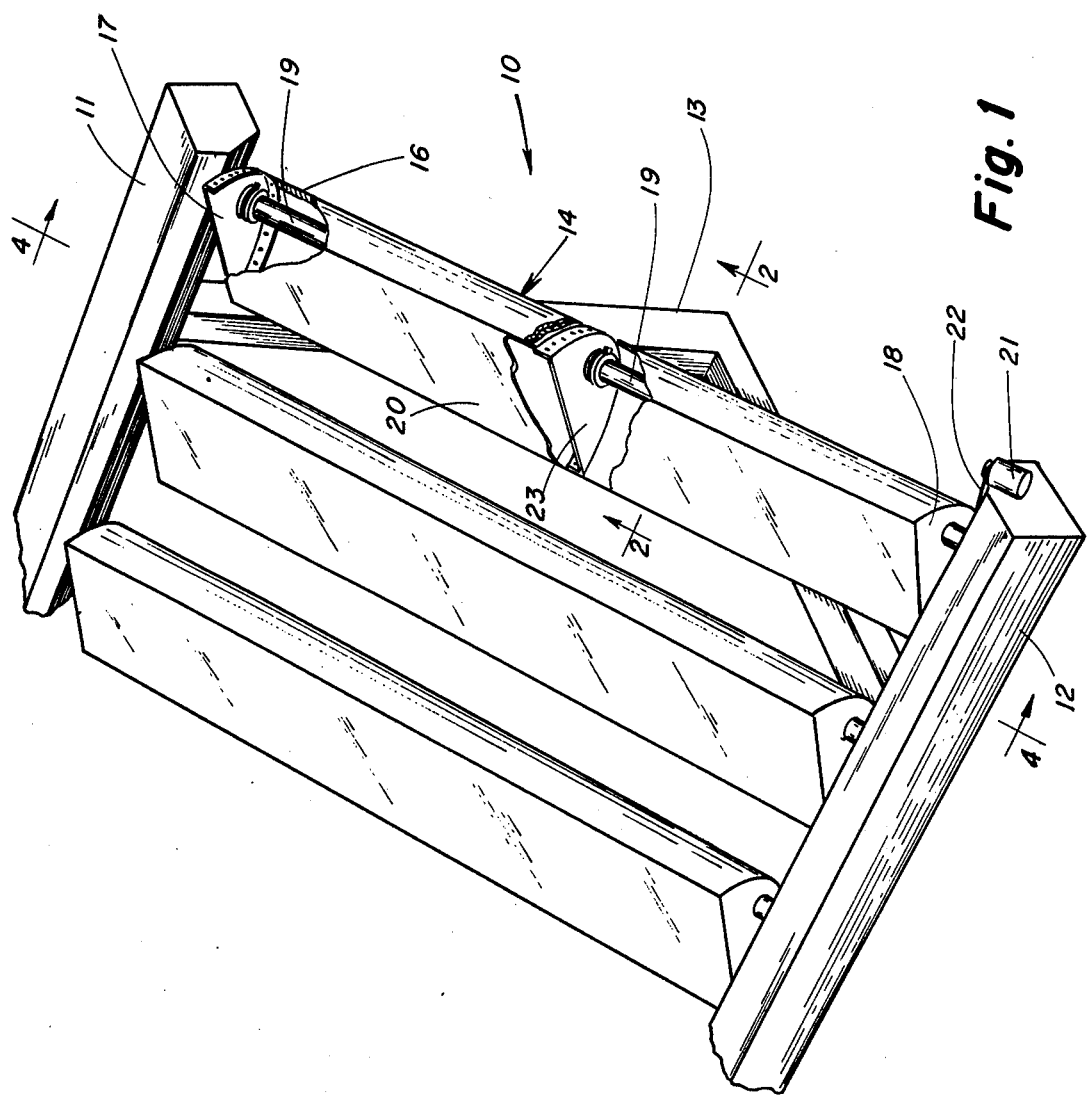
FIG. 1 is a perspective view of a solar energy collector constructed in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Solar energy collectors form one component of solar energy systems which are becoming increasingly important in the overall energy scheme. Solar energy systems frequently involve complex and expensive components, and the cost of acquiring the energy is thereby made prohibitive. However, the present invention provides a solar energy collector which is both inexpensive and simple to construct, and which is adapted for use with a variety of solar energy systems.

Referring in particular to the figures, there is shown a solar energy collector 10 constructed in accordance with the present invention. Collector 10 includes an upper header 11 and a lower header 12 interconnected by pipe 19 and brace 13. Solar energy collector 10 includes any number of individual collector units, such as 14, which are identical in construction.

Figure 2:
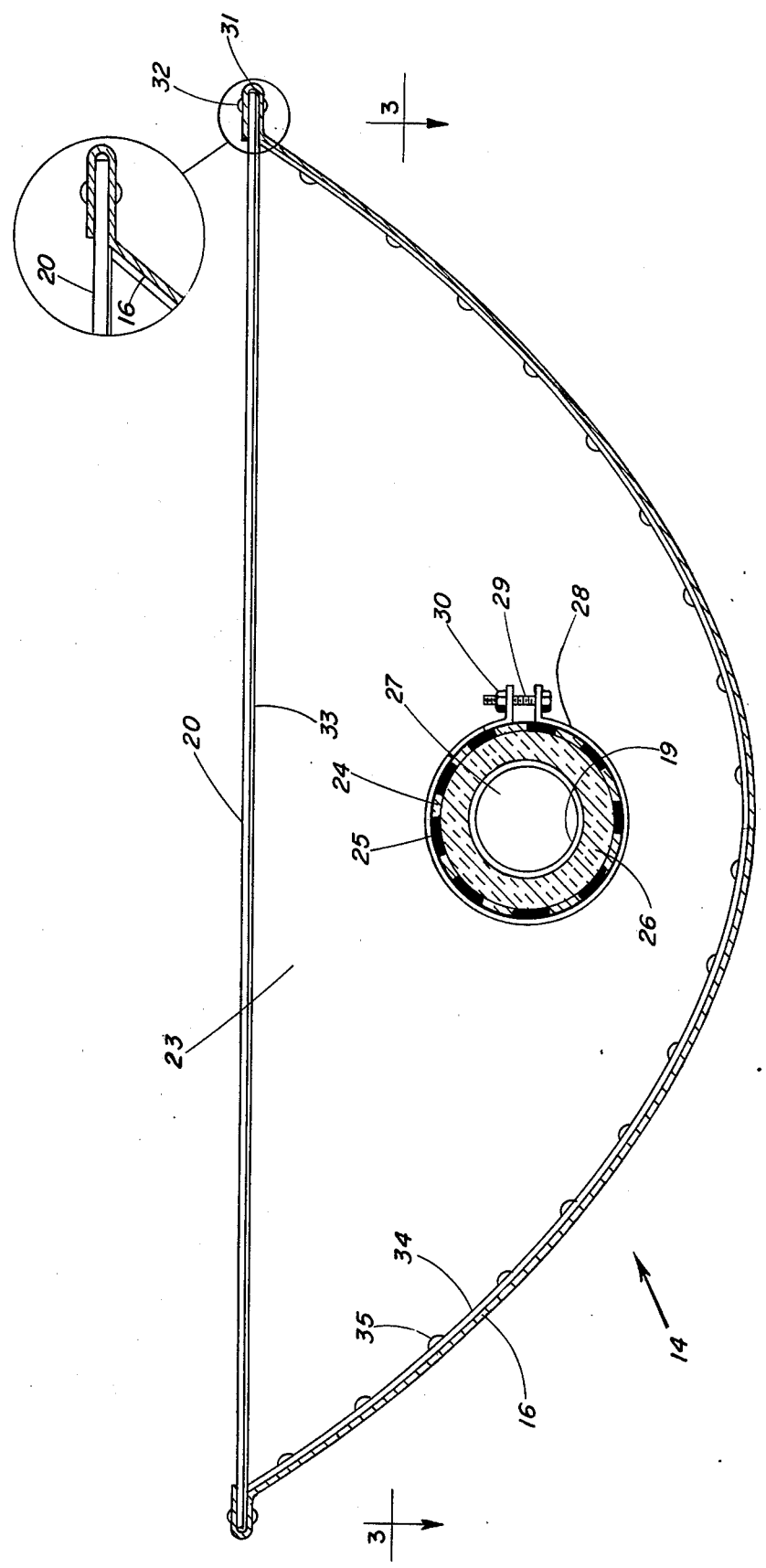
FIG. 2 is a cross-sectional view of the solar energy collector of FIG. 1, taken along the line 2—2 in FIG. 1 in the direction of the arrows.
Figure 3:
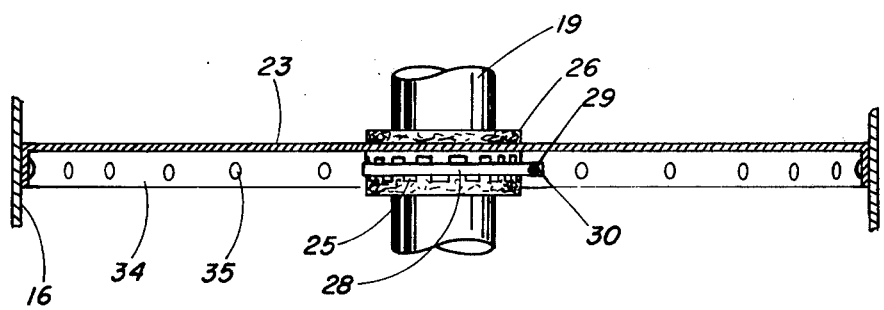
FIG. 3 is a cross-sectional view of the solar energy collector of FIG. 1, taken along the line 3—3 in FIG. 2 in the direction of the arrows.

Collector unit 14 includes panels such as 17 and 18 against which is positioned a reflector 16. Reflector 16 is secured to pipe 19 by several panels, also referred to herein as bulkheads, such as end panels 17 and 18 and intermediate panel 23. A transparent cover 20 is mounted to reflector 16. Referring in particular to FIGS. 2 and 3, the mounting of reflector 16 to pipe 19 through support panels, such as 23, is more clearly shown. Panel 23 includes several tabs 25 formed by bending portions of panel 23 at an angle to the plane of the panel. Tabs 25 are separated by interlying spaces 24 (FIG. 2). Pipe 19 is received within the opening defined by panel 23 and an insulating ring 26 is positioned about pipe 19 and within the circular area defined by tabs 25. Ring clamp 28 extends about tabs 25 and includes a bolt 29 threadedly received by nut 30. Tightening nut 30 upon bolt 29 draws the ends of ring clamp 28 together, as is known in the art, and forces tabs 25 against insulating ring 26, and thereby also against pipe 19. Panel 23 is thus secured to pipe 19 by the operation of ring clamp 28.

Reflector 16 is mounted to panel 23. Panel 23 includes a peripheral flange 34 (FIG. 3) which is connected to reflector 16 by rivets, such as 35. Transparent cover 20 is also mounted to reflector 16 and extends above the top 33 (FIG. 2) of panel 23. Reflector 16 includes a portion 31 which is lipped over the edge of cover 20 and is secured thereto by rivets, such as 32 (FIG. 2).

Figure 4:
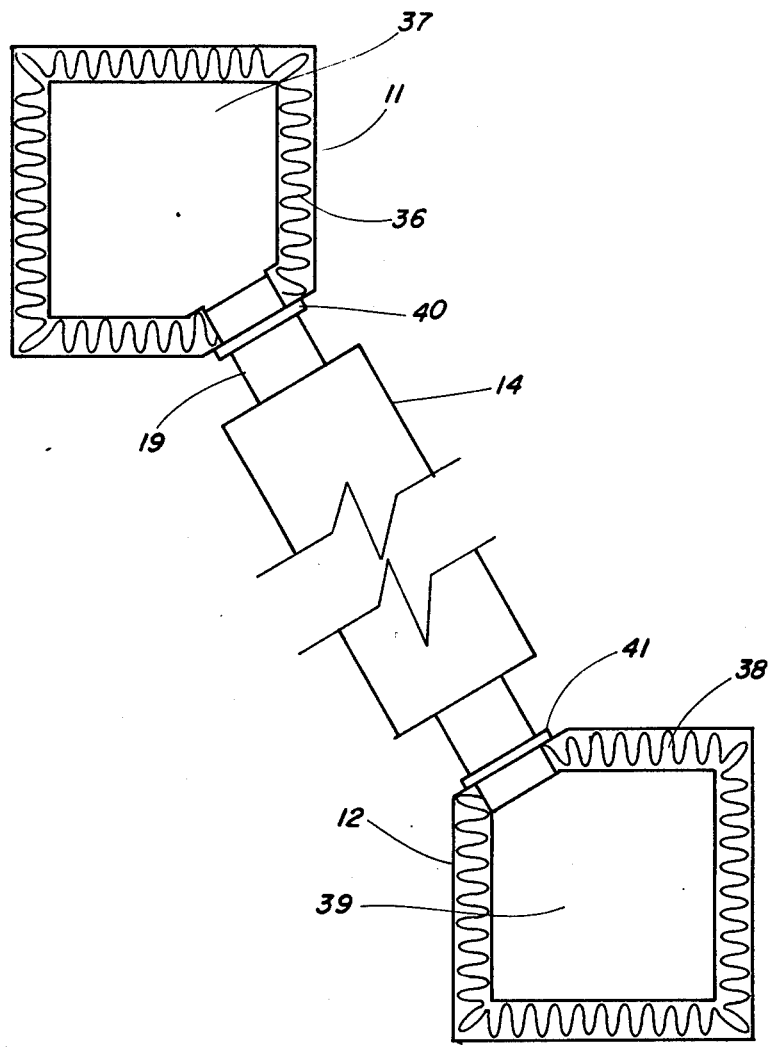
FIG. 4 is a diagrammatic, cross-sectional view of the solar energy collector of FIG. 1, taken along the line 4—4 in FIG. 1 in the direction of the arrows.
Figure 5:
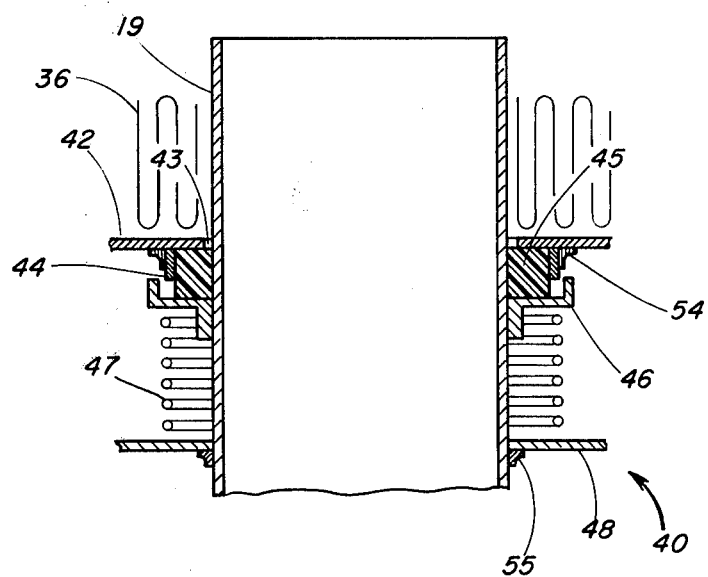
FIG. 5 is a partial, cross-sectional view of the pipe and upper header of the solar energy collector of FIG. 1.

Referring now in particular to FIGS. 4 and 5, the interconnection of upper header 11 to pipe 19 is more clearly detailed. Upper header 11 comprises a conduit for the conduction of fluid therethrough, and includes an interior opening 37 for reception of the fluid. The walls of upper header 11 define an interior space filled with insulation 36 for preventing heat loss through the walls of upper header 11. A sealing assembly 40 is included to sealingly interconnect pipe 19 with upper header 11. Outer wall 42 (FIG. 5) of upper header 11 defines an aperture surrounded by ring 44 which is secured to wall 42 by welding 54. Pipe 19 includes an annular shoulder 48 secured thereto by welding 55. A clamp ring 46 is slidingly received on pipe 19 and is urged away from shoulder 48 by compression spring 47. Pipe 19 extends into opening 43 in wall 42, and ring seal 45 is disposed between wall 42 and clamp ring 46. Upper header 11 supports pipe 19, outer wall 42 being positioned adjacent ring seal 45, which is in turn supported by pipe 19 through clamp ring 46, compression spring 47 and annular shoulder 48. The force exerted by upper header 11 upon ring seal 45 causes deformation of ring seal 45, and confinement of the ring seal by ring 44 produces a fluid seal of opening 43.

Figure 6:
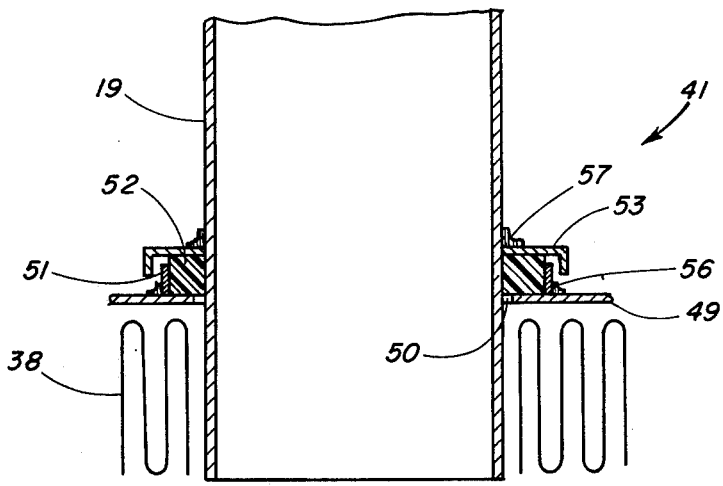
FIG. 6 is a partial, cross-sectional view of the pipe and lower header of the solar energy collector of FIG. 1.

Referring now in particular to FIGS. 4 and 6, the interconnection of pipe 19 and lower header 12 is clearly shown. Lower header 12 defines an interior opening 39 for fluid flow. Heat loss from interior 39 is minimized by the presence of insulation 38 located between the walls of lower header 12. Sealing assembly 41 provides for a sealed connection of pipe 19 with lower header 12. Assembly 41 includes a clamp ring 53 secured to pipe 19 by welding 57. Ring 51 is secured to outer wall 49 of lower header 12 by welding 56. Pipe 19 is received within opening 50 defined by outer wall 49, and ring seal 52 is disposed between outer wall 49 and clamp ring 53. The force exerted by the weight of the pipe and collector assembly is transmitted through pipe 19 and clamp ring 53 to ring seal 52. Outer wall 49 supports ring seal 52 and clamp ring 53, thereby supporting pipe 19 and the attached collector. Ring seal 52 is deformed by the force exerted upon it through clamp ring 53, and is urged in the direction of pipe 19 by ring 51, thereby providing a fluid seal of opening 50.

The solar energy collector of the present invention provides a simple and inexpensive structure for the efficient collection of solar energy. As described, the collector includes a reflective material supported upon panels. The panels are preferably preformed to have parabolic outer edges against which a sheet of a reflective material, preferably aluminum, is positioned. A transparent cover, which may be made for example from a variety of available plastics or glass, is mounted to the edges of the reflective surfaces and the end panels or bulkheads to provide the familiar green house effect, further enhancing the efficiency of the system. Pipe 19 extends through and is secured with the panels, and structurally supports the panels. The pipe is preferably steel in composition and preferably has a diameter of at least about 2 inches to provide the structural strength. More preferably, a 4 inch diameter steel pipe is used as pipe 19. The panels and the upper and lower headers are formed from a variety of materials known to be suitable for the indicated applications.

As shown in FIG. 1, pipe 19 is preferably positioned, as by brace 13, at an incline from horizontal, thus facilitating the directing of the reflective surface toward the sun. The solar energy collector 10 further includes a timing motor 21 which connects to pipe 19 through belt 22 in any known manner. Timing motor 21 is operable to rotate pipe 19 relative the upper and lower headers, and thereby maintains the directing of the reflective surface towards the sun as it moves in a path across the sky. In this manner, the solar energy collector has an increased efficiency due to its reception of solar energy during a major portion of the daylight hours.

The use of a relatively large diameter pipe 19 serves a plurality of functions. The structural strength obtained by using a large pipe permits pipe 19 to be used as a structural support for the bulkheads and associated reflector. The large diameter of the pipe further provides a broad target for the energy rays reflected from the reflective material, and thus provides a compensation for non-precise directing of the reflector at the sun.

The solar energy collector 10 of the present invention is adapted for use with a solar energy system which would further provide for storage of the received energy and distribution of the energy to a structure such as a home. One example of a solar energy system with which the collector of the present invention may be used will here be described. With the solar energy collector 10 used to collect the solar energy by transferring it to air, the lower and upper headers are connected through air ducts to heat exchanger tubes which extend through a hot water storage tank. Thermostats are located within the hot water in the storage tank and also within passageway 27 of pipe 19. A first selector control is operable to open a damper within the air duct returning from the heat-exchanger tubes to the lower header of the solar energy collector. The first selector control also is operable to activate a fan located within the return air duct. When the temperature within passageway 27 is a predetermined value greater than the temperature within the hot storage tank, the damper and fan are activated. This causes the circulation of air through the solar energy collector 10, and will cause the heat in the air passing through the heat-exchanger tubes within the hot water storage tank to increase the temperature of the water within the tank. A thermostat is also located within the structure to be heated. When the temperature within the structure drops below the predetermined value as set by the thermostat within the structure, a second selector control activates a fan to direct air into the structure. The second fan is connected by appropriate duct work to the return air duct leading to the lower header of the solar energy collector, the heated air duct leading from the upper header of the solar energy collector, and a duct leading from the structure. A thermostat located immediately upstream of the second fan is operable to control dampers located in the ducts leading to the fan from the heated air duct and the structure duct to control the temperature of the air forced to the structure by the second fan. The air duct leading from the structure connects not only to the second fan, but also to the return air duct upstream of the first fan which forces air through the solar energy collector. In this manner, the relatively warm air from the house not returned with the heated air to the house is passed through the solar energy collector and utilized to transfer heat energy to the water in the hot water storage tank. The foregoing solar energy system is provided only as a description of an exemplary system with which the solar energy collector of the present invention may be utilized. It is to be understood that the solar energy collectors of the present invention are of such simple and inexpensive construction that they are readily adaptable to any of a variety of solar energy systems.

As indicated in the foregoing description, pipe 19 includes an interior passageway 27 which communicates with the interiors 37 and 39 of the upper and lower headers 11 and 12, respectively. This intercommunication provides means for passing a fluid media through pipe 19 to receive the solar energy directed toward the exterior of pipe 19 by reflector 16. The air or other fluid media may be conducted through pipe 19 in either direction. Timing motor 21 and the inclination of pipe 19 from horizontal provides a means for tracking the movement of the sun across the sky throughout the day, thereby causing the reflector to face generally towards the sun to most efficiently direct the impinging rays against pipe 19.

While the invention has been illustrated and described in detail in the drawings and foregoing description, the same is to be considered as illustrative and not restrictive in character, it being understood that only the preferred embodiment have been shown and described and that all changes and modifications that come within the spirit of the invention are desired to be protected.

What is claimed is:

1. A solar energy collector adapted for use with a solar energy system comprising:
   a lower header defining an open interior;
   a pipe connected to said lower header, said pipe defining a passageway communicating with the interior of said lower header;
   an upper header connected with said pipe, said upper header defining an open interior communicating with the passageway of said pipe;
   means for supporting said upper header above said lower header; and
   a unitary reflector mounted to and supported by said pipe, said reflector oriented to direct rays impinging thereupon at said pipe, said reflector comprising a plurality of rigid panels defining apertures within which said pipe is received, said reflector including two end panels and at least one intermediate panel located therebetween, the panels having formed edges surrounding and displaced from a portion of said pipe, said reflector further comprising a reflective material mounted to the formed edges.

2. The apparatus of claim 1 in which the reflective material has a trough-shaped surface defining a parabolic cross-section, said reflector mounted to said pipe to position said pipe at about the focal line of the reflective material.

3. The apparatus of claim 1 in which said supporting means further is for supporting said pipe inclined from horizontal.

4. The apparatus of claim 1 and which includes conducting means for conducting a fluid through said pipe from one of said lower and upper headers to the other of said lower and upper headers.

5. The apparatus of claim 1 and which includes tracking means for moving said reflector to face generally toward a source of solar energy.

6. The apparatus of claim 3 and which includes tracking means for moving said reflector to face generally toward a source of solar energy.

7. The apparatus of claim 6 in which said tracking means including means for rotating said pipe.

8. The apparatus of claim 1 in which said upper header defines an opening, said pipe having an exterior shoulder at one end, the one end of said pipe extending into the opening of said upper header, said upper header being positioned adjacent the shoulder of said pipe.

9. The apparatus of claim 8 in which said lower header defines an opening, said pipe having a second end extending into the opening of said lower header, said pipe including a second exterior shoulder near the second end, the second shoulder of said pipe resting on and being supported by said lower header.

* * * * *